United States Patent [19]
Fonticoli

[11] Patent Number: 4,840,117
[45] Date of Patent: Jun. 20, 1989

[54] MACHINE FOR THE PRODUCTION OF PUFFED CEREALS

[76] Inventor: Alfredo R. Fonticoli, Via Milano, 23, 20090 - Cesano Boscone (Milano), Italy

[21] Appl. No.: 37,221

[22] Filed: Apr. 10, 1987

[30] Foreign Application Priority Data

Dec. 9, 1986 [IT] Italy ................. 22615 A/86

[51] Int. Cl.⁴ .................. A23L 1/00; A23L 1/18
[52] U.S. Cl. ........................ 99/323.4; 99/467
[58] Field of Search ............. 99/323.4, 467, 484, 99/323.7, 471, 485; 426/233, 244, 447, 446, 807, 50; 220/211, 222, 244, 334

[56] References Cited

U.S. PATENT DOCUMENTS

| | | | |
|---|---|---|---|
| 2,086,266 | 7/1937 | Heue et al. | 99/323.4 |
| 2,116,212 | 5/1938 | Plews | 99/323.4 |
| 2,259,802 | 10/1941 | Crosby et al. | 99/323.4 |
| 3,299,799 | 1/1967 | Heiland | 99/323.4 |
| 4,188,869 | 2/1980 | Komen | 99/584 |
| 4,209,537 | 6/1980 | Wood | 99/323.4 X |
| 4,566,375 | 1/1986 | van der Shoot | 99/584 X |
| 4,699,797 | 10/1987 | Fast | 99/471 X |

*Primary Examiner*—Timothy F. Simone
*Attorney, Agent, or Firm*—Bucknam and Archer

[57] ABSTRACT

A machine for the production of puffed cereals comprising at least one pair of rotating drums which are mounted on a platform tippable about a transverse axis at one end. The drums have hinged sealing doors carried on respective plates pivoted on projections and closable automatically by fluid pressure actuators. The doors can be latched in the closed position by a latch mechanism acting on the associated plate and comprising a latch element one end of which is displaceable by a bracket carried on a fluid pressure actuator.

2 Claims, 3 Drawing Sheets

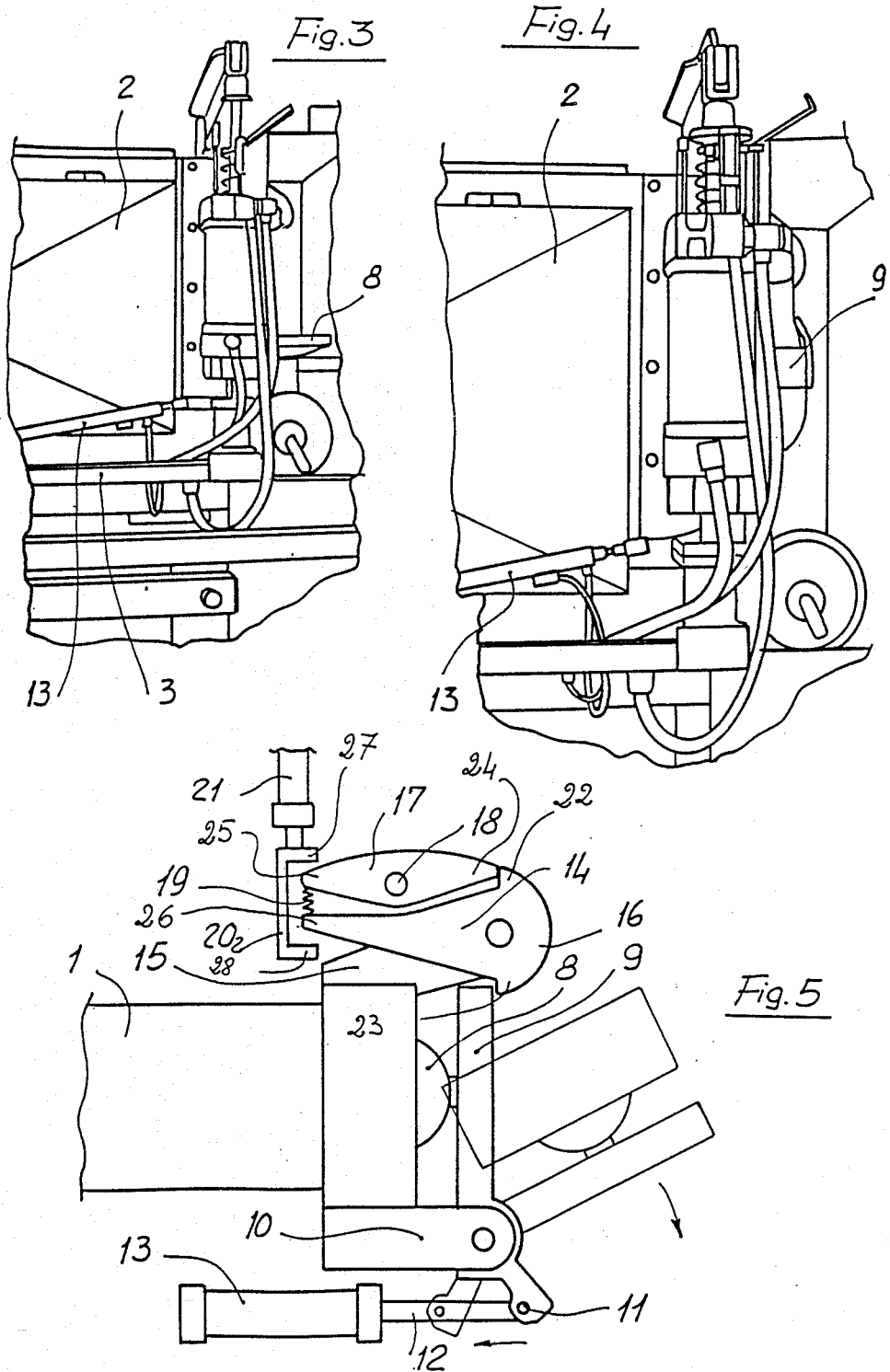

MACHINE FOR THE PRODUCTION OF PUFFED CEREALS

BACKGROUND OF THE INVENTION

It has been known for some time that certain cereals, notably wheat, can be caused to expand or 'puff' by subjecting them to a heating and pressure varying treatment. This treatment causes the cereals to exhibit physical characteristics substantially resembling those of an expanded material, but does not detrimentally affect their food value. Indeed, by making the cereal more palatable the food value can be considered as being increased by such treatment.

Known machines for performing this treatment, essentially perform successive cooking pressurisation and expansion operations on the cereal. Conventional machines, however, even if provided with control apparatus for performing these operations in an almost automatic manner, nevertheless suffer from a number of operating disadvantages which reduce their efficiency. More particularly, in current machines for the production of puffed cereals, especially those provided with a pair of rotatable pressurisable heatable drums as the essential components of the machines, the means for filling the drums at the beginning of each treatment cycle do not operate in an entirely automatic manner.

Likewise, each drum is provided with a sealing door to enable the drum to be pressurised, and the closure of the sealing door of each individual drum, after having been filled has to be effected manually in conventional machines, with a consequent unwanted interruption of the operating cycle. This arises largely from the fact that the drum has to be rotated about a substantially horizontal axis to perform the puffing treatments whereas the sealing door is most conveniently located at one end of the drum, which is not the most convenient orientation for filling.

OBJECTS OF THE INVENTION

One object of the present invention is to eliminate the previously indicated disadvantages by providing an improved machine for the production of puffed cereals, which is provided with devices operable to allow the automatic closure of the sealing doors of the various drums, after these have been filled with the cereal to be treated.

Another object of the present invention is to provide an improved machine for the production of puffed cereals, in which the cereals to be treated can be supplied to the individual drum as part of a direct automatic process.

A further object of the present invention is to provide an improved machine for the production of puffed cereals, the operation of which is totally automatic and only requires the operator to perform control operations and no routine manual operations such as opening or closing doors or tipping the drum between a filling orientation and a working orientation.

SUMMARY OF THE INVENTION

According to the present invention a machine for the production of puffed cereals has at least one pair of rotatable drums having a closed end and an open end closable by a hinged sealing door, the rotatable drums being mounted on a platform turnable about a transverse axis at one end thereof adjacent the said closed ends of the drums, and each hinged sealing door of each drum having associated fluid pressure actuating means for automatically opening and closing the sealing door, and an associated latch mechanism operable automatically to lock the door in the closure position and to release it at the end of a cereal treatment operation.

Various other features and advantages of the present invention will become apparent from a study of the following descriptions of a preferred embodiment, in which reference is made to the accompanying drawings, provided purely by way of non-limitative example.

BRIEF DESCRIPTION OF THE DRAWINGS

FIGS. 3 and 4 are side views of the loading end of the drums with the door in an open and a closed position respectively; and FIG. 5 is a schematic side view of the mechanism for effecting closure, locking and subsequent releasing of the doors;

DESCRIPTION OF THE PREFERRED EMBODIMENT

Figure 1:
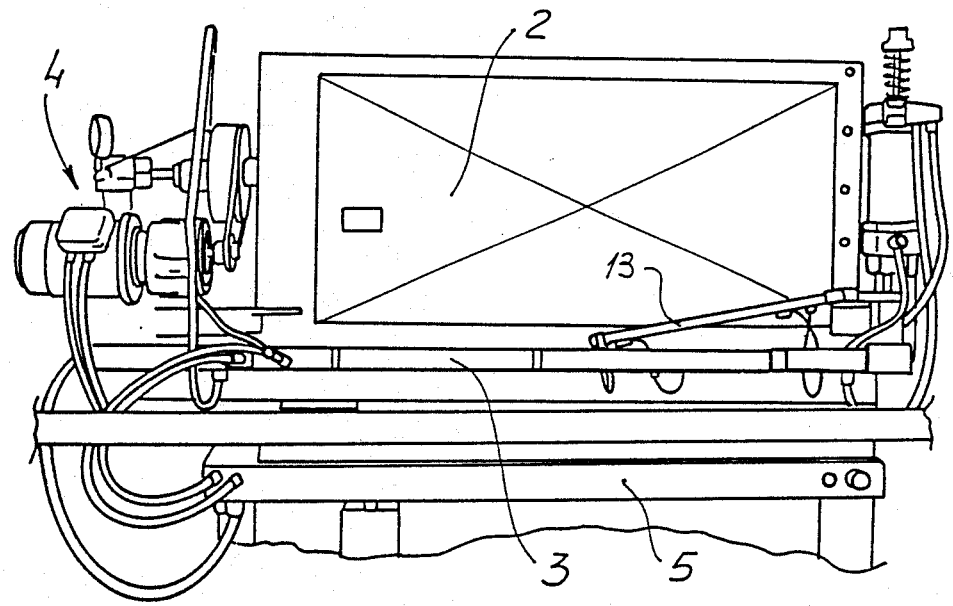
FIG. 1 is a side view of a box-like casing enclosing a pair of rotating drums and mounted on a tiltable platform.
Figure 2:
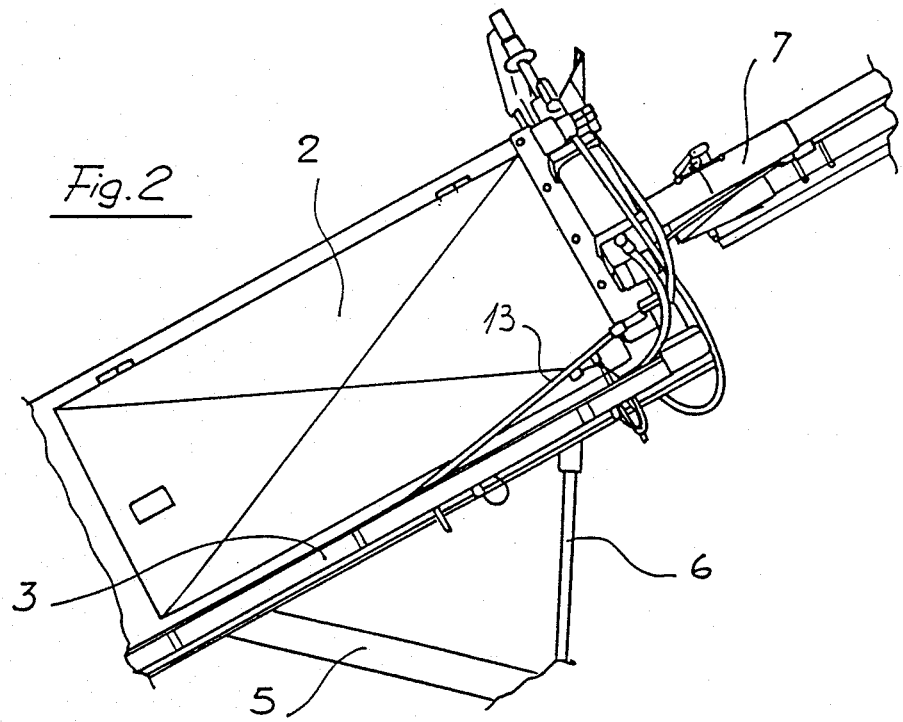
FIG. 2 is a side view showing the platform tilted upwardly in a position, for the rotating drums to be filled.
Figure 6:
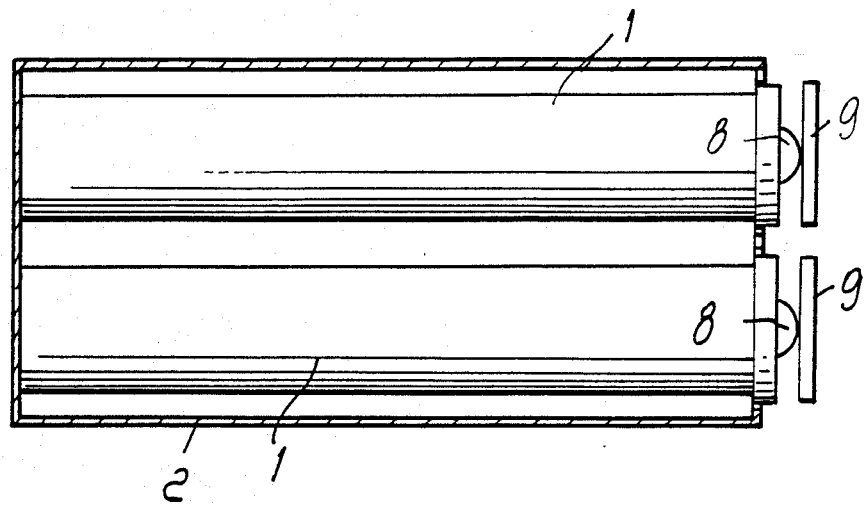
FIGS. 6 and 7 are respectively schematic partial front and side views illustrating the rotating drums included in the machine according to the invention.
Figure 7:
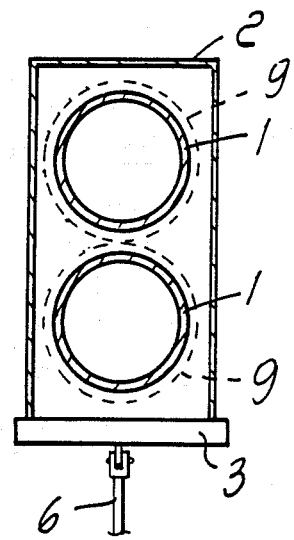

Referring now to the drawings, the machine for the production of puffed cereals essentially comprises at least two rotatable drums which are not individually shown in that they are of known conformation. These drums, one of which is schematically indicated with the reference numeral 1 in FIG. 5, have a closed end and an open end and are disposed alongside one another, and are mounted by means of a suitable box-like frame 2 on a platform 3. This latter is provided at one end, at which end are provided conventional devices, generally indicated 4, for driving the drums and for unloading the finished product after treatment, as well as pressurisation, detection control and actuation of the various operating stages of the treatment. These devices 4 and the platform 3 are carried on an appropriate base 5. The platform 3 can be tilted upwardly from the horizontal position shown in FIG. 1 by means of one or more double acting cylinders 6 as shown in FIG. 2, in such a way as to bring the open ends of the drums into register with corresponding cereal supply ducts 7.

Referring particularly to FIG. 5, the open end of each drum 1, is closable by means of a respective sealing door 8 fixedly connected to a plate 9, pivoted at its lower part to a first, projecting, portion 10 of the drum. This plate 9 is provided with at least one projecting arm 11 lying at an angle with respect to the plane of the plate itself. To this projection the actuating rod 12 of a linear fluid pressure actuator 13 is pivotally connected in such a way that extension of the actuator rod 12 causes upward rotation of the associated plate 9 to cause closure of the door 8.

An upper element 14 structured in the manner of a latch and pivoted to a second projecting portion 15 of the drum cooperates with the door 8 in a manner which will be described in detail below. This upper element 14 has a complex shape with a body in the form of an isosceles triangle of small angle with an end portion 16 having a generally semi-circular outline. This end portion 16 has a radius of curvature greater than the length of the base side of the isosceles triangle defined by the body portion 14 so as to form upper and lower projecting noses 22, 23 respectively. The lower nose 23 in effect acts to retain the edge of the plate 9 as shown in FIG. 5, and the upper nose 22 engages one end 24 of an elongate rocker member 17 having a generally rhomboidal outline, which is pivoted about an axis 18 near its mid point.

This elongate rhomboidal rocker member 17 has an opposite end 25 remote from the said one end engaged by the nose 22, which is contacted by one end of a compression spring 19 the other end of which reacts against the narrow end 26 of the isosceles triangle defined by the body 14 of the latch element.

The said two ends 15 and 26, moreover, are held between two arms 27, 28 of a bracket or fork 20 carried by the rod of a double acting pneumatic actuator 21.

In use, at the end of the cereal treatment, the bracket 20 is urged downwardly by extension of the actuator 21 in such a way as to rotate the element 14 anti-clockwise (as viewed in FIG. 5) and consequently to liberate the plate 9 which will then automatically turn in a clockwise direction because of the pressure existing in the corresponding drum causing retraction of the actuator 13 if this is of single-acting type, or assisted by retraction of this actuator 13 if it is of double-acting type. The drum can then be unloaded, tilted up by extension of the actuator 6 to tilt the platform 3, and filled with a new charge of cereal through the duct 7. After the drum has been loaded with the cereal to be treated the door 8 can be re-closed by extension of the actuator 13; then the said C-shaped bracket is raised upwardly by retraction of the double-acting actuator 21, causing clockwise rotation of the latch element 14 the lower nose 23 of which locks the plate 9 in the closure position. This closure position of the plate 9 and of the associated door 8, is guaranteed by the engagement between the end 24 of the elongate rocker member 17 and the upper nose 22 of the said latch element 14.

What is claimed is:

1. A machine for the production of puffed cereals comprising:

at least one pair of rotatable drums disposed alongside one another, each drum having a closed end an an open end, said open end being closable by a sealing door hingedly mounted at said open end of each said drum, said sealing door being movable between an open position and a closed position, said rotatable drums being mounted on a box like frame rigid with a platform turnable about a transverse axis, fluid pressure actuating means associated with each said sealing door of each said drum, said fluid pressure actuating means being provided for automatically opening and closing the associated said sealing door, a latch mechanism associated with each said sealing door and operable automatically to lock each said door in the closure position and to release each said door at the end of a cereal treatment operation, said platform being pivoted a the end thereof adjacent said closed ends of said drums and being engaged at a point remote from said pivoted end by at least one double-acting fluid pressure actuator which is extendable to tilt said platform to bring said open ends of said drums into register with respective cereal supply ducts, each said sealing door being fixedly connected to a respective plate having a lower part pivoted to a projecting portion of an associated drum of said drums, said plate being provided with at least one projecting arm laying at an angle to the plane of said plate, said machine further comprising a fluid pressure actuator, having an actuating rod connected to said projecting arm whereby extension and retraction of said fluid pressure actuator causes rotation of said plate and closure and opening of said door, said latch mechanism cooperating with said plate to hold said door in the closure position thereof, said latch mechanism comprising a latch body pivotally connected to a second projecting portion of each said drum, said latch body having the shape of an isoscele triangle of small angle, an arcuate projecting portion of said latch body at the base thereof, respective upper and lower nose projections of said projecting base portion, said lower nose projection being engageable with said plate and said upper nose projection being engageable with one end of a locking rocker member pivoted in the vicinity of the mid point thereof.

2. A machine according to claim 1, wherein said locking rocker member has a free end remote from said one end thereof engaged by said upper nose of said projecting base portion, said free end being engaged by one end of a compression spring the other end of which reacts against the narrow end of said isosceles latch body, said free end of said locking rocking member and said narrow end of said isosceles latch body being engaged by a generally C-shaped bracket carried by a further fluid pressure actuator acting to lock and release said plate automatically whereby respectively to lock and release each said sealing door upon extension and retraction of said further fluid pressure actuator.

* * * * *